(12) United States Patent
Akkarakaran et al.

(10) Patent No.: US 11,463,949 B2
(45) Date of Patent: Oct. 4, 2022

(54) POWER SAVINGS WITH BEAM-SPECIFIC REPEATER OPERATION

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/879,425

(22) Filed: May 20, 2020

(65) Prior Publication Data
US 2020/0396679 A1 Dec. 17, 2020

Related U.S. Application Data

(60) Provisional application No. 62/861,176, filed on Jun. 13, 2019.

(51) Int. Cl.
*H04W 52/02* (2009.01)
*H04W 72/04* (2009.01)
*H04L 5/00* (2006.01)
*H04B 7/155* (2006.01)

(52) U.S. Cl.
CPC .... *H04W 52/0203* (2013.01); *H04B 7/15507* (2013.01); *H04L 5/0055* (2013.01); *H04W 72/044* (2013.01)

(58) Field of Classification Search
CPC combination set(s) only.
See application file for complete search history.

(56) References Cited

U.S. PATENT DOCUMENTS

| | | | |
|---|---|---|---|
| 6,980,832 B1 * | 12/2005 | Ylitalo | H04B 7/0491 455/12.1 |
| 10,772,151 B2 * | 9/2020 | Zhou | H04B 7/0426 |
| 10,842,876 B2 * | 11/2020 | Il | A61K 47/34 |

(Continued)

FOREIGN PATENT DOCUMENTS

WO WO-2020201885 A1 * 10/2020

OTHER PUBLICATIONS

Apple Inc: "Evaluation of UE Power Saving Techniques", 3GPP R1-1902770, Evaluation of UE Power Saving, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600465, 22 pages, Retrieved from the Internet: URL: http://www.3gpp.org/ftp/tsg%5Fran/WG1%5FRL1/TSGR1%5F96/Docs/R1%2D1902770%2Ezip. [retrieved on Feb. 16, 2019] the whole document.

(Continued)

*Primary Examiner* — Rasheed Gidado
(74) *Attorney, Agent, or Firm* — Harrity & Harrity, LLP

(57) ABSTRACT

Various aspects of the present disclosure generally relate to wireless communication. In some aspects, a user equipment may receive a physical downlink control channel (PDCCH) based at least in part on a PDCCH configuration. The user equipment may determine a minimum scheduling delay based at least in part on the PDCCH configuration associated with receiving the PDCCH. The user equipment may operate in a partial sleep-state based at least in part on the minimum scheduling delay. Numerous other aspects are provided.

28 Claims, 4 Drawing Sheets

(56) References Cited

U.S. PATENT DOCUMENTS

| | | | | |
|---|---|---|---|---|
| 2010/0331037 | A1* | 12/2010 | Jen | H04L 1/1887 |
| | | | | 455/522 |
| 2012/0002596 | A1* | 1/2012 | Kim | H04L 5/0057 |
| | | | | 370/315 |
| 2012/0039239 | A1* | 2/2012 | Park | H04B 7/155 |
| | | | | 370/315 |
| 2012/0099520 | A1* | 4/2012 | Kwon | H04W 72/042 |
| | | | | 370/315 |
| 2013/0322324 | A1* | 12/2013 | Kim | H04W 36/0077 |
| | | | | 370/315 |
| 2015/0036656 | A1* | 2/2015 | McCarthy | H04B 7/0689 |
| | | | | 370/331 |
| 2019/0045550 | A1* | 2/2019 | Jang | H04W 76/28 |
| 2019/0068268 | A1* | 2/2019 | Zhang | H04B 7/0632 |
| 2019/0349862 | A1* | 11/2019 | Akkarakaran | H04W 52/146 |
| 2019/0363857 | A1* | 11/2019 | Hwang | H04L 5/001 |
| 2020/0187172 | A1* | 6/2020 | Wang | H04B 7/0695 |
| 2020/0236692 | A1* | 7/2020 | Lin | H04L 5/0094 |
| 2020/0404648 | A1* | 12/2020 | Kim | H04W 72/0446 |

OTHER PUBLICATIONS

International Search Report and Written Opinion—PCT/US2020/034012—ISA/EPO—dated Aug. 26, 2020.

MCC Support: "Final Report of 3GPP TSG RAN WG1 #96 V1.0.0 (Athens. Greece. Feb. 25-Mar. 1, 2019)", 3GPP Draft, Final Minutes Report RAN1#96 V1.0.0, 3rd Generation Partnership Project (3GPP), Mobile Competence Centre, 650, Route Des Lucioles, F-06921 Sophia-Antipolis Cedex, France, vol. RAN WG1, No. Xian. China, Apr. 8, 2019-Apr. 12, 2019, Apr. 5, 2019 (Apr. 5, 2019), XP051707051, Retrieved from the Internet: URL: http://www.3gpp.org/ftp/tsg%5Fran/WG1%5FRL1/TSGR1%5F96/Report/Final%5FMinutes%5Freport%5FRAN1%2396%5Fv100%2Ezip. [retrieved on Apr. 5, 2019] the whole document.

Nokia, et al., "On UE Adaptation to the Traffic," 3GPP Draft, 3GPP TSG RAN WG1 Meeting #95,R1-1813620, 3rd Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 11, 2018 (Nov. 11, 2018) XP051555678, 11 pages, Retrieved from the Internet: URL: http://www.3gpp.org/ftp/Meetings%5F3GPP%5FSYNC/RAN1/Docs/R1%2D1813620%2Ezip [retrieved on Nov. 11, 2018] section 2.4.

Qualcomm Incorporated: "UE Adaptation to the Traffic and UE Power Consumption Characteristics," 3GPP Draft, 3GPP TSG-RAN WG1 Meeting #95, R1-1813447, UE Adaptation for Power Saving, 3rd Generation Partnership Project (3GPP), Mobile Competence Centre, 650, Route Des Lucioles, F-06921, Sophia-Antipolis Cedex, France, vol. RAN WG1, No. Spokane, Washington, USA, Nov. 12, 2018-Nov. 16, 2018, Nov. 11, 2018, XP051555486, 20 Pages, Retrieved from the Internet: URL: http://www.3gpp.org/ftp/Meetings%5F3GPP%5FSYNC/RAN1/Docs/R1%2D1813447%2Ezip [retrieved on Nov. 11, 2018], Section 5.2, Section 4.3.2, the whole document.

* cited by examiner

POWER SAVINGS WITH BEAM-SPECIFIC REPEATER OPERATION

CROSS-REFERENCE TO RELATED APPLICATION

This Patent Application claims priority to U.S. Provisional Patent Application No. 62/861,176, filed on Jun. 13, 2019, entitled "POWER SAVINGS WITH BEAM-SPECIFIC REPEATER OPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power savings with beam-specific repeater operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a physical downlink control channel (PDCCH) based at least in part on a PDCCH configuration; and determining a minimum scheduling delay based at least in part on the PDCCH configuration associated with receiving the PDCCH.

In some aspects, a UE for wireless communication may include memory and one or more processors operatively coupled to the memory. The memory and the one or more processors may be configured to receive a PDCCH based at least in part on a PDCCH configuration; and determine a minimum scheduling delay based at least in part on the PDCCH configuration associated with receiving the PDCCH.

In some aspects, a non-transitory computer-readable medium may store one or more instructions for wireless communication. The one or more instructions, when executed by one or more processors of a UE, may cause the one or more processors to: receive a PDCCH based at least in part on a PDCCH configuration; and determine a minimum scheduling delay based at least in part on the PDCCH configuration associated with receiving the PDCCH.

In some aspects, an apparatus for wireless communication may include means for receiving a PDCCH based at least in part on a PDCCH configuration; and means for determining a minimum scheduling delay based at least in part on the PDCCH configuration associated with receiving the PDCCH.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
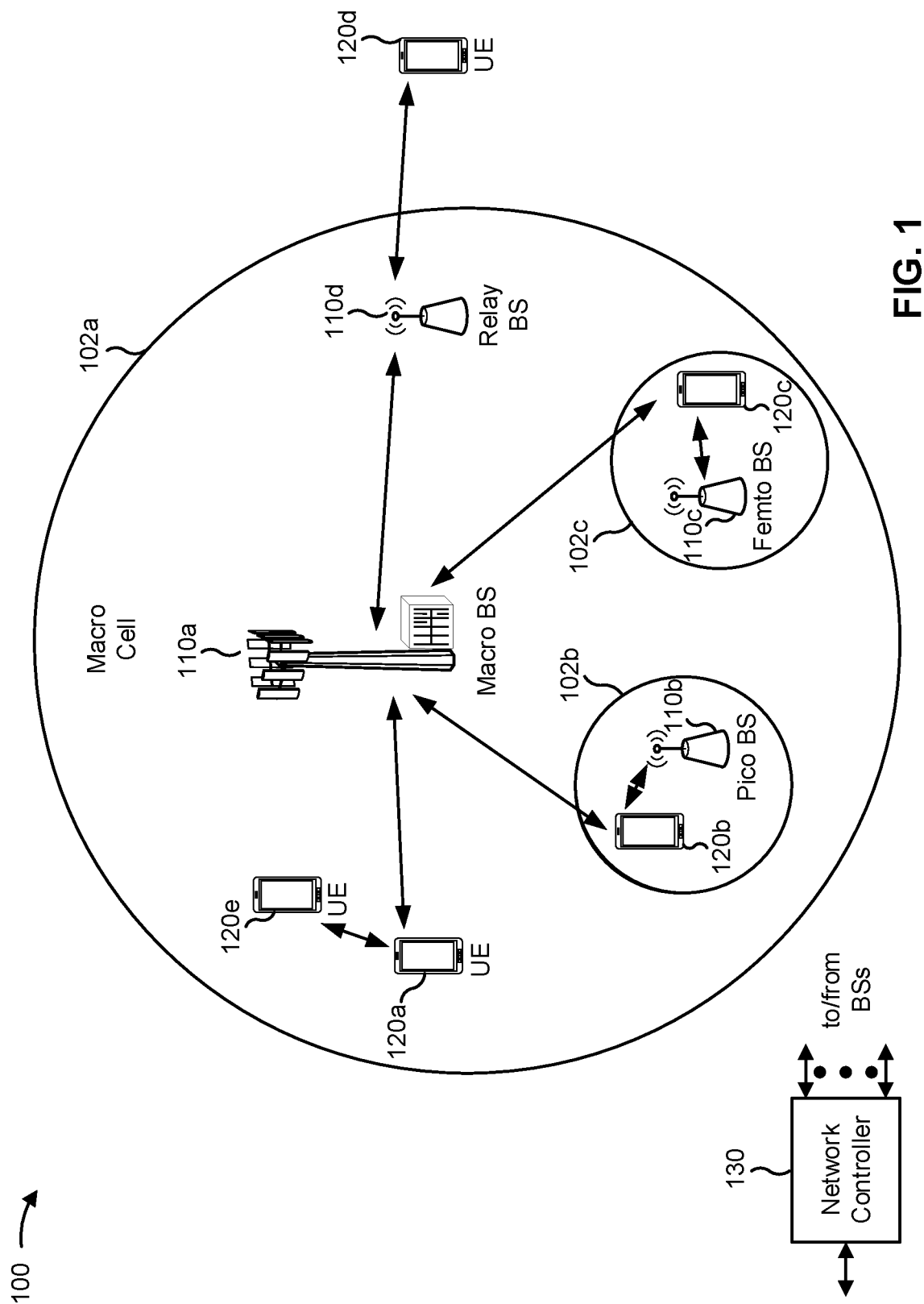
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, a repeater, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
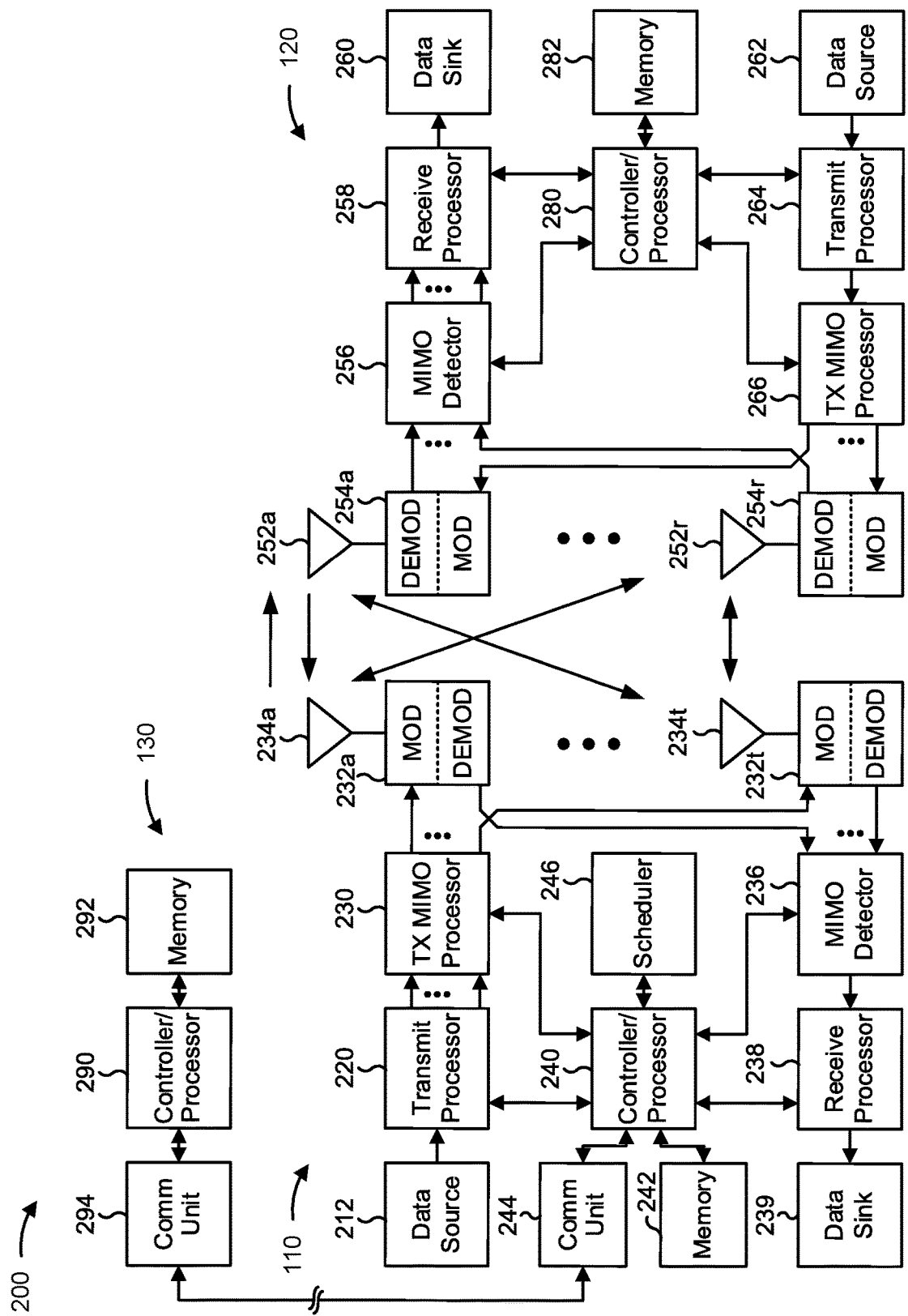
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with power savings with beam-specific repeater operation, as described in more detail elsewhere herein. For example, controller/processor 240 of base station 110, controller/processor 280 of UE 120, and/or any other component(s) of FIG. 2 may perform or direct operations of, for example, process 4 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 400 of FIG. 4 and/or other processes as described herein. A scheduler 246 may schedule UEs for data transmission on the downlink and/or uplink.

In some aspects, UE 120 may include means for receiving a physical downlink control channel (PDCCH) based at least in part on a PDCCH configuration; and means for determining a minimum scheduling delay based at least in part on the PDCCH configuration associated with receiving the PDCCH; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In a wireless communication network, such as an NR network, various scheduling delays may be defined. Such scheduling delays include, for example, a delay between a downlink grant in a physical downlink control channel (PDCCH) and a physical downlink shared channel (PDSCH) communication scheduled by the downlink grant. This scheduling delay is referred to as a k0 parameter. Another example of a scheduling delay is a delay between a PDSCH communication scheduled by a downlink grant included in the PDCCH and a transmission of an acknowledgment or negative acknowledgment (ACK/NACK) associated with the PDSCH communication. This scheduling delay is referred to as a k1 parameter. Another example of a scheduling delay is a delay between an uplink grant in the PDCCH and a physical uplink shared channel (PUSCH) communication scheduled by the uplink grant. This scheduling delay is referred to as a k2 parameter. Note that the parameters k0, k1 and k2 may be expressed in units of slots, and there may be corresponding parameters n0, n1 and n2 that are expressed in units of OFDM symbols instead. For simplicity of description, the concepts described herein are described in the context of the k-parameters, but it is to be understood that similar concepts can be applied to the corresponding n-parameters as well.

It is possible for minimum scheduling delays (i.e., minimum k values) to be utilized to reduce power consumption. For example, if a minimum value for the k0 parameter is or can be configured to be greater than 0, then a UE receiving a PDCCH can buffer PDCCH samples, enter a partial sleep-state (e.g., by turning of an RF front-end of the UE), and decode the PDCCH during operation in the partial sleep-state. If the UE receives a downlink grant in the PDCCH, then the UE may wake-up (e.g., by turning on the RF front-end) to receive a PDSCH communication. Otherwise, the UE may remain in the partial sleep-state until a later time (e.g., when the UE receives another PDCCH). Further, when powering on the RF front-end to receive the PDSCH communication, the UE may open the RF front-end only to a particular bandwidth required to receive the PDSCH communication (i.e., the bandwidth of an active bandwidth part (BWP), or the bandwidth of the specific PDSCH resource grant as indicated in the PDCCH carrying the scheduling downlink control information (DCI)) rather than a bandwidth that may be needed for receiving the PDCCH (i.e., a bandwidth of monitored control resource sets (CORESETs)). Power consumption in this example is reduced as compared to a case in which the minimum value for the k0 parameter is 0, as in that case, the RF front-end must always be configured based on the largest possible PDSCH grant (i.e., based on the full BW of the active BWP).

When the minimum value for the k0 parameter is 0, the UE buffers possible PDCCH samples and a PDSCH slot together, even if PDCCH decoding ultimately reveals that the PDCCH did not carry a grant for the UE, which requires more power (e.g., as compared to a case in which the UE can enter the partial sleep-state and then selectively power on the RF front-end to receive the PDSCH). Further, the PDCCH bandwidth may be larger than the potential PDSCH bandwidth, meaning that the RF front-end is opened to a comparatively wider bandwidth for the duration of the PDCCH and PDSCH, which results in wasted power resources (e.g., as compared to a case in which the UE can selectively open the RF front-end to a comparatively smaller bandwidth when receiving the PDSCH). Similar concepts apply to use of the k1 parameter and the k2 parameter by potentially enabling a more efficient sleep-state (e.g., since the UE has more time for PDCCH decoding with a larger k2 parameter, and more time for PDSCH decoding and ACK/NACK generation with a larger k1 parameter).

In some scenarios, it may be advantageous to allow a minimum scheduling delay (i.e., a minimum value for the k0, k1, and/or k2 parameters) to be a function of a beam. For example, in a scenario in which a UE is served by a repeater associated with a serving base station using a particular beam (e.g., rather than being served directly by the serving base station), the repeater may introduce delay when forwarding communications to the UE. In such a case, allowing a minimum scheduling delay to be a function of the beam may improve power savings by accounting for the delay introduced by the repeater when forwarding communications via the particular beam. Additional details and examples are provided below with regard to FIG. 3.

Some aspects described herein provide techniques and apparatuses for power savings with beam-specific repeater operation. In some aspects, a UE may determine a minimum scheduling delay based at least in part on a PDCCH configuration associated with receiving a PDCCH, where the minimum scheduling delay corresponds to a beam associated with the PDCCH configuration. The UE may then operate in a partial sleep-state based at least in part on the minimum scheduling delay. In some aspects, the techniques and apparatuses described herein reduce power consumption by the UE by, for example, improving efficiency associated with operating in the partial sleep-state and/or associated with operation of the RF front-end of the UE.

Figure 3:
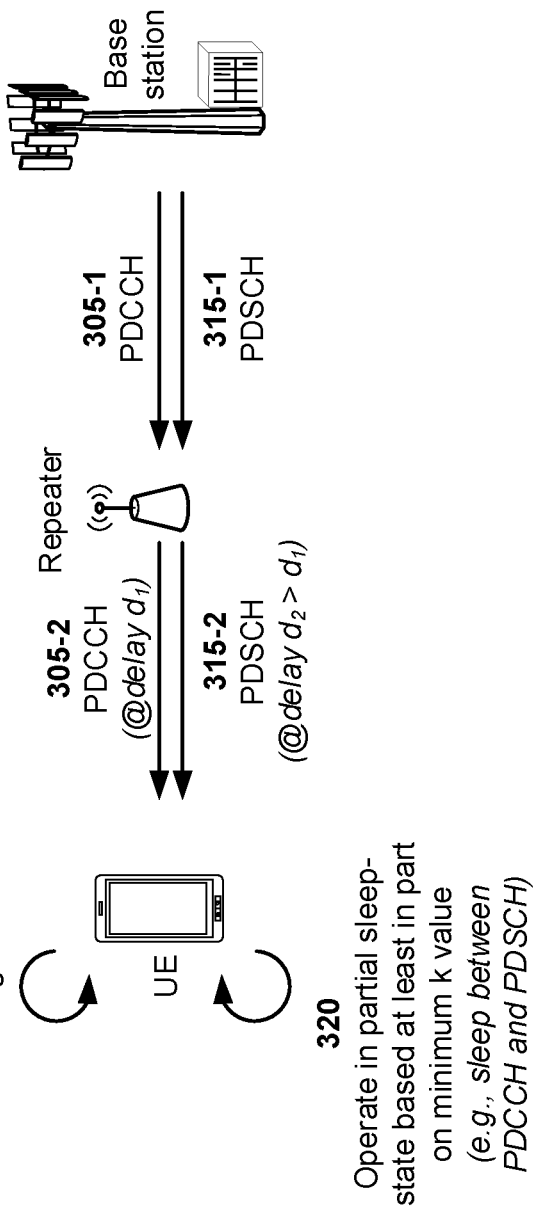
FIG. 3 is a diagram illustrating an example associated with power savings with beam-specific repeater operation, in accordance with various aspects of the present disclosure.

FIG. 3 is a diagram illustrating an example 300 associated with power savings with beam-specific repeater operation, in accordance with various aspects of the present disclosure.

In the example shown in FIG. 3, a UE (e.g., UE 120) is served by a repeater (e.g., base station 110d) associated with a serving base station (e.g., base station 110) using a particular beam (e.g., rather than the UE being served directly by a beam of the serving base station). For example, the UE may be located inside a tunnel, and the repeater may be located at a mouth of the tunnel. Here, the UE may not be aware of being in a tunnel, but may be configured with a beam/quasi-co-location (QCL) information corresponding to beam of the repeater that is directed into the tunnel. In some aspects, the repeater may be configured to amplify and forward (with a change of beam-direction) one or more QCL-source reference signals (RSs) (e.g., a channel state information RS (CSI-RS) transmitted by the serving base station, a synchronization signal block (SSB) transmitted by the serving base station, and/or the like) for reception by the UE. Alternatively, the repeater may be configured to send the one or more RSs on a defined time-frequency resource for reception by the UE. Here, one or more CORESETs and one or more transmission configuration indicator (TCI) states can be configured to indicate QCL with the one or more RSs.

As shown by reference numbers 305-1 and 305-2, the repeater may receive a PDCCH from the serving base station and forward the PDCCH to the UE (using the beam directed into the tunnel). In some aspects, the repeater may relay the PDCCH with relatively low latency (e.g., as compared to a latency when relaying a PDSCH, as described below). For example, the repeater may be configured to amplify and forward the PDCCH (with a change of beam-direction) or to decode and forward the PDCCH. Notably, while decoding and forwarding the PDCCH is inherently slower than amplifying and forwarding the PDCCH, decoding and forwarding the PDCCH may still introduce less latency than that introduced when decoding and forwarding the PDSCH. Here, since the latency introduced by amplifying and forwarding or decoding and forwarding the PDCCH (identified as delay $d_1$) is less than the latency introduced by decoding and forwarding the PDSCH (identified as delay $d_2$), a minimum value needed for the k0 parameter is inherently larger while the UE is located inside the tunnel. This means that the minimum scheduling delay in this case can be configured to cause the UE to operate in the partial sleep-state for a longer duration of time (e.g., as compared to that of a UE served directly by the serving base station).

As shown by reference number 310, the UE may determine a minimum scheduling delay based at least in part on a PDCCH configuration associated with receiving the PDCCH. For example, the UE may determine a minimum scheduling delay based at least in part on a monitoring occasion associated with receiving the PDCCH, a PDCCH search space associated with receiving the PDCCH, a CORESET associated with receiving the PDCCH (e.g., a time-frequency window in which the PDCCH may be received), or a radio network temporary identifier (RNTI) associated with receiving the PDCCH. Here, the minimum scheduling delay may correspond to the beam associated with the PDCCH configuration.

For example, the minimum scheduling delay may correspond to a beam associated with a CORESET. To clarify, the UE may be configured with multiple TCI states, where each configured TCI state effectively defines a beam. Associated with each CORESET there may be a pointer to a configured TCI state. It follows that a given CORESET is associated with a particular beam (as defined by an associated TCI state) that is to be used for receiving a PDCCH in the given CORESET. In this example, the UE may be configured with a minimum scheduling delay to be associated with the given CORESET and, therefore, the minimum scheduling delay may correspond to the beam (since the beam is associated with the CORESET).

In some aspects, the minimum scheduling delay is for a delay between a downlink grant included in the PDCCH and a PDSCH communication scheduled by the downlink grant (i.e., the minimum scheduling delay may be for the k0 parameter).

In some aspects, the minimum scheduling delay may be for a delay between a PDSCH communication scheduled by a downlink grant included in the PDCCH and a transmission of an ACK/NACK associated with the PDSCH communication (i.e., the minimum scheduling delay may be for the k1 parameter).

In some aspects, the minimum scheduling delay may be for a delay between an uplink grant included in the PDCCH and a PUSCH communication scheduled by the uplink grant (i.e., the minimum scheduling delay may be for the k2 parameter).

In some aspects, the minimum scheduling delay may be configured based at least in part on a configuration of the beam associated with the PDCCH configuration. For example, when the beam associated with a given CORESET is changed, the corresponding minimum scheduling delay may also be changed. In some aspects, the minimum scheduling delay may be implicitly configured based at least in part on a beam configuration or reconfiguration. For example, the minimum scheduled delay may be configured using a table associating particular minimum scheduling delays (e.g., minimum k values) and particular beams corresponding to each beam. In some aspects, the minimum scheduling delay may be explicitly configured based at least in part on a configuration or reconfiguration of the minimum scheduling delay (e.g., the minimum k value corresponding to the beam may be configuration or reconfigured). In some aspects, the minimum scheduling delay may be configured via radio resource control (RRC) signaling, a medium access control (MAC) control element, downlink control information (DCI), and/or the like.

As shown by reference numbers 315-1 and 315-2, the repeater may receive a PDSCH from the serving base station and forward the PDSCH for reception by the UE. In some aspects, the repeater may relay the PDSCH with relatively high latency (e.g., as compared to a latency when relaying a PDCCH). For example, the repeater may decode and forward the PDSCH, which introduces larger latency than both amplifying and forwarding the PDCCH and decoding and forwarding the PDCCH.

As shown by reference number 320, the UE may operate in a partial sleep-state based at least in part on the minimum scheduling delay. For example, when the minimum scheduling delay is for the k0 parameter, the UE may buffer PDCCH samples, enter a partial sleep-state (e.g., by turning off an RF front-end of the UE), and decode the PDCCH during operation in the partial sleep-state. Here, if the UE receives a downlink grant in the PDCCH, then the UE may wake-up (e.g., by turning on the RF front-end) to receive a PDSCH communication associated with the downlink grant. In this example, since the minimum scheduling value may be configured to account for the additional latency introduced by the repeater when forwarding the PDSCH, the UE may remain in the partial sleep-state for an amount of time that improves power savings (e.g., the UE can remain in the partial sleep-state for the comparatively longer period of time identified by the minimum scheduling delay that corresponds to the beam).

Power consumption in this example is reduced as compared to a case in which the minimum value for the k0 parameter is not configured to account for the latency introduced by the repeater. In this way, the beam-specific minimum scheduling delay may be utilized to improve efficiency associated with UE operation in the partial sleep-state and/or associated with operation of the RF front-end of the UE. Notably, the above described techniques can be similarly applied to minimum scheduling values of for the k1 parameter and the k2 parameter in order to improve sleep-state operational efficiency.

Notably, were the UE to move to a location that is near the mouth of the tunnel, the UE could continue to be served by the repeater, or the beam could be reconfigured to a direct beam from the serving base station (in which case the minimum scheduling delay would need to be reconfigured—either explicitly, or implicitly via reconfiguration of beam or TCI state, if the minimum scheduling delay is associated with the beam or TCI state).

As indicated above, FIG. 3 is provided as an example. Other examples may differ from what is described with respect to FIG. 3. Generally, the above described techniques and apparatuses can be applied to any scenario in which a repeater is used to provide coverage to an area not readily served by a serving base station associated with that area. These techniques and apparatuses can be further generalized for use in a multi-panel or multi-beam scenario, such as when the repeater has multiple panels and/or beams and the UE performs beam-training to identify a suitable beam, when multiple repeaters are inside of a tunnel and/or at each mouth of the tunnel, and/or the like.

Figure 4:
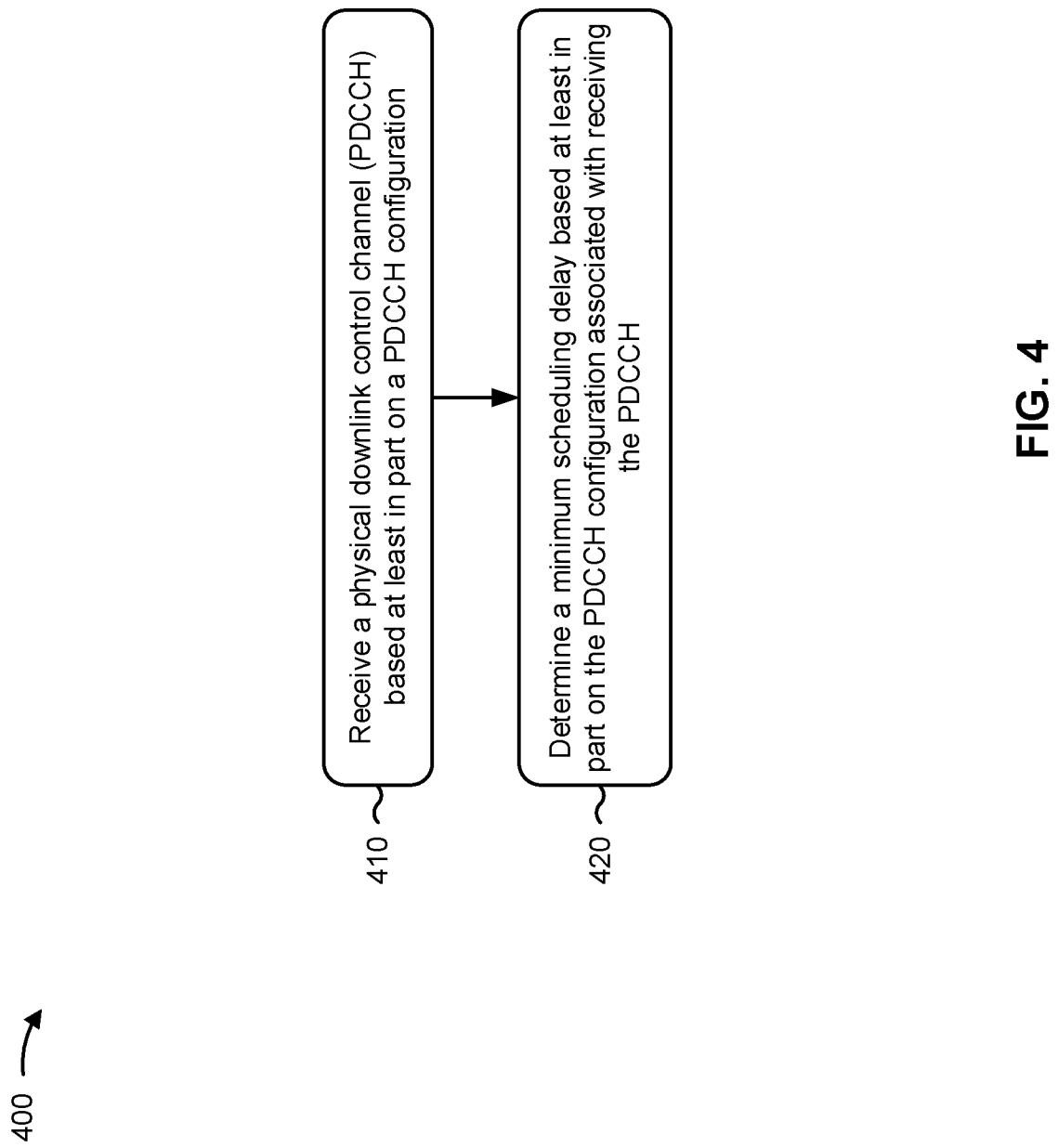
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with power savings with beam-specific repeater operation.

As shown in FIG. 4, in some aspects, process 400 may include receiving a PDCCH based at least in part on a PDCCH configuration (block 410). For example, the UE (e.g., using receive processor 258, transmit processor 264, controller/processor 280, memory 282, and/or the like) may receive a PDCCH based at least in part on a PDCCH configuration, as described above.

As shown in FIG. 4, in some aspects, process 400 may include determining a minimum scheduling delay based at least in part on the PDCCH configuration associated with receiving the PDCCH (block 420). For example, the UE (e.g., using receive processor 258, transmit processor 264, controller/processor 280, memory 282, and/or the like) may determine a minimum scheduling delay based at least in part on the PDCCH configuration associated with receiving the PDCCH, as described above. In some aspects, the minimum scheduling delay corresponds to a beam associated with the PDCCH configuration.

Process 400 may include additional aspects, such as any single aspect or any combination of aspects described below and/or in connection with one or more other processes described elsewhere herein.

In a first aspect, the UE is served by a repeater associated with a serving base station (e.g., base station 110).

In a second aspect, alone or in combination with the first aspect, the minimum scheduling delay is for a delay between a downlink grant included in the PDCCH and a PDSCH communication scheduled by the downlink grant.

In a third aspect, alone or in combination with one or more of the first and second aspects, the minimum scheduling delay is for a delay between a PDSCH communication scheduled by a downlink grant included in the PDCCH and a transmission of an ACK/NACK associated with the PDSCH communication.

In a fourth aspect, alone or in combination with one or more of the first through third aspects, the minimum scheduling delay is for a delay between an uplink grant included in the PDCCH and a PUSCH communication scheduled by the uplink grant.

In a fifth aspect, alone or in combination with one or more of the first through fourth aspects, the PDCCH configuration is a PDCCH monitoring occasion associated with receiving the PDCCH.

In a sixth aspect, alone or in combination with one or more of the first through fifth aspects, the PDCCH configuration is a PDCCH search space associated with receiving the PDCCH.

In a seventh aspect, alone or in combination with one or more of the first through sixth aspects, the PDCCH configuration is a control resource set (CORESET) associated with receiving the PDCCH.

In an eighth aspect, alone or in combination with one or more of the first through seventh aspects, the minimum scheduling delay is configured based at least in part on a configuration of the beam associated with the PDCCH configuration.

In a ninth aspect, alone or in combination with one or more of the first through eighth aspects, the minimum scheduling delay is implicitly configured based at least in part on a beam configuration or reconfiguration.

In a tenth aspect, alone or in combination with one or more of the first through ninth aspects, the minimum scheduling delay is configured based at least in part on a table associating particular minimum scheduling delays and particular beams.

In an eleventh aspect, alone or in combination with one or more of the first through tenth aspects, the minimum scheduling delay is explicitly configured based at least in part on a reconfiguration of the minimum scheduling delay.

In a twelfth aspect, alone or in combination with one or more of the first through eleventh aspects, the minimum scheduling delay is configured via at least one of: RRC signaling, a MAC control element, or DCI.

In a thirteenth aspect, alone or in combination with one or more of the first through twelfth aspects, process 400 further comprises operating in a partial sleep-state based at least in part on the minimum scheduling delay.

In a fourteenth aspect, alone or in combination with one or more of the first through thirteenth aspects, the PDCCH configuration is a RNTI associated with receiving the PDCCH.

In a fifteenth aspect, alone or in combination with one or more of the first through fourteenth aspects, the PDCCH configuration is at least one of a PDCCH monitoring occasion associated with receiving the PDCCH, a PDCCH search space associated with receiving the PDCCH, a CORESET associated with receiving the PDCCH, or a RNTI associated with receiving the PDCCH.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a repeater, a physical downlink control channel (PDCCH) communication based at least in part on a PDCCH configuration, wherein the repeater receives the PDCCH from a serving base station and relays the PDCCH to the UE with a latency;
   determining a minimum scheduling delay, of minimum scheduling delays corresponding to beam configurations, based at least in part on a beam configuration, of the beam configurations, associated with PDCCH configuration; and
   decoding, while in a partial-sleep state and based at least in part on determining the minimum scheduling delay, the PDCCH communication.

2. The method of claim 1, wherein the minimum scheduling delay is for a delay between a downlink grant included in the PDCCH communication and a physical downlink shared channel (PDSCH) communication scheduled by the downlink grant.

3. The method of claim 1, wherein the minimum scheduling delay is for a delay between a physical downlink shared channel (PDSCH) communication scheduled by a downlink grant included in the PDCCH communication and a transmission of an acknowledgment or negative acknowledgment (ACK/NACK) associated with the PDSCH communication.

4. The method of claim 1, wherein the minimum scheduling delay is for a delay between an uplink grant included in the PDCCH communication and a physical uplink shared channel (PUSCH) communication scheduled by the uplink grant.

5. The method of claim 1, wherein the PDCCH configuration is a PDCCH monitoring occasion associated with receiving the PDCCH communication.

6. The method of claim 1, wherein the PDCCH configuration is a PDCCH search space associated with receiving the PDCCH communication.

7. The method of claim 1, wherein the PDCCH configuration is a control resource set (CORESET) associated with receiving the PDCCH communication.

8. The method of claim 1, wherein the PDCCH configuration is a radio network temporary identifier (RNTI) associated with receiving the PDCCH.

9. The method of claim 1, wherein the PDCCH configuration is at least one of:
   a PDCCH monitoring occasion associated with receiving the PDCCH communication,
   a PDCCH search space associated with receiving the PDCCH communication,
   a control resource set (CORESET) associated with receiving the PDCCH communication, or
   a radio network temporary identifier (RNTI) associated with receiving the PDCCH communication.

10. The method of claim 1, wherein the minimum scheduling delay is configured based at least in part on the beam configuration.

11. The method of claim 1, wherein the minimum scheduling delay is implicitly configured based at least in part on the beam configuration or a beam reconfiguration of another beam configuration of the beam configurations.

12. The method of claim 1, wherein the minimum scheduling delay is configured based at least in part on a table associating the minimum scheduling delays and particular beams, and wherein the particular beams correspond to the beam configurations.

13. The method of claim 1, wherein the minimum scheduling delay is explicitly configured based at least in part on a reconfiguration, of the minimum scheduling delay, corresponding to the beam configuration.

14. The method of claim 1, wherein the minimum scheduling delay is configured via at least one of:

radio resource control (RRC) signaling,
a medium access control (MAC) control element, or
downlink control information (DCI).

15. The method of claim 1, wherein the PDCCH communication is modulated by the repeater.

16. The method of claim 1, further comprising:
entering, while in the partial-sleep state and based on receiving a downlink grant included in the PDCCH communication, a normal state to receive a physical downlink shared channel (PDSCH) communication scheduled by the downlink grant.

17. The method of claim 16, wherein the partial-sleep sate corresponds to a radio frequency front end of the UE being turned off.

18. A user equipment (UE) for wireless communication, comprising:
a memory; and
one or more processors coupled to the memory, the one or more processors configured to:
receive, from a repeater, a physical downlink control channel (PDCCH) communication based at least in part on a PDCCH configuration, wherein the repeater receives the PDCCH from a serving base station and relays the PDCCH to the UE with a latency;
determine a minimum scheduling delay, of minimum scheduling delays corresponding to beam configurations, based at least in part on a beam configuration, of the beam configurations, associated with the PDCCH configuration; and
decode, while in a partial-sleep state and based at least in part on determining the minimum scheduling delay, the PDCCH communication.

19. The UE of claim 18, wherein the minimum scheduling delay is for a delay between:
a downlink grant included in the PDCCH communication and a physical downlink shared channel (PDSCH) communication scheduled by the downlink grant,
a PDSCH communication scheduled by a downlink grant included in the PDCCH communication and a transmission of an acknowledgment or negative acknowledgment (ACK/NACK) associated with the PDSCH communication, or
an uplink grant included in the PDCCH communication and a physical uplink shared channel (PUSCH) communication scheduled by the uplink grant.

20. The UE of claim 18 wherein the PDCCH configuration is at least one of:
a PDCCH monitoring occasion associated with receiving the PDCCH communication,
a PDCCH search space associated with receiving the PDCCH communication,
a control resource set (CORESET) associated with receiving the PDCCH communication, or
a radio network temporary identifier (RNTI) associated with receiving the PDCCH communication.

21. The UE of claim 18, wherein the minimum scheduling delay is configured based at least in part on a table associating the minimum scheduling delays and particular beams, and wherein the particular beams correspond to the beam configurations.

22. The UE of claim 18, wherein the minimum scheduling delay is explicitly configured based at least in part on a reconfiguration, of the minimum scheduling delay, corresponding to the beam configuration.

23. The UE of claim 18, wherein the minimum scheduling delay is configured via at least one of:
radio resource control (RRC) signaling,
a medium access control (MAC) control element, or
downlink control information (DCI).

24. The UE of claim 18, wherein the PDCCH communication is modulated by the repeater.

25. The UE of claim 18, wherein the one or more processors are further configured to:
enter, while in the partial-sleep state and based on receiving a downlink grant included in the PDCCH communication, a normal state to receive a physical downlink shared channel (PDSCH) communication scheduled by the downlink grant.

26. The UE of claim 18, wherein the partial-sleep sate corresponds to a radio frequency front end of the UE being turned off.

27. A non-transitory computer-readable medium storing one or more instructions for wireless communication, the one or more instructions comprising:
one or more instructions that, when executed by one or more processors of a user equipment (UE), cause the one or more processors to:
receive, from a repeater, a physical downlink control channel (PDCCH) communication based at least in part on a PDCCH configuration, wherein the repeater receives the PDCCH from a serving base station and relays the PDCCH to the UE with a latency;
determine a minimum scheduling delay, of minimum scheduling delays corresponding to beam configurations, based at least in part on a beam configuration associated with the PDCCH configuration; and
decode, while in a partial sleep state and based at least in part on determining the minimum scheduling delay, the PDCCH communication.

28. An apparatus for wireless communication, comprising:
means for receiving, from a repeater, a physical downlink control channel (PDCCH) communication based at least in part on a PDCCH configuration, wherein the repeater receives the PDCCH from a serving base station and relays the PDCCH to the apparatus with a latency;
means for determining a minimum scheduling delay, of minimum scheduling delays corresponding to beam configurations, based at least in part on a beam configuration associated with the PDCCH configuration; and
means for decoding, while in a partial sleep state and based at least in part on determining the minimum scheduling delay, the PDCCH communication.

\* \* \* \* \*